United States Patent
Min et al.

(10) Patent No.: US 12,452,777 B2
(45) Date of Patent: Oct. 21, 2025

(54) METHOD AND ELECTRONIC DEVICE FOR SCANNING CHANNELS IN FREQUENCY BANDS

(71) Applicant: SAMSUNG ELECTRONICS CO., LTD., Suwon-si (KR)

(72) Inventors: Hyunkee Min, Suwon-si (KR); Ashish Gupta, Suwon-si (KR); Taeyong Kim, Suwon-si (KR); Yeji Yoon, Suwon-si (KR); Junghun Lee, Suwon-si (KR); Junyeop Jung, Suwon-si (KR); Seongsu Choi, Suwon-si (KR); Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 18/120,211

(22) Filed: Mar. 10, 2023

(65) Prior Publication Data
US 2023/0209449 A1    Jun. 29, 2023

Related U.S. Application Data

(63) Continuation of application No. PCT/KR2022/095149, filed on Oct. 27, 2022.

(30) Foreign Application Priority Data

Dec. 10, 2021  (KR) .................. 10-2021-0176259
May 25, 2022  (KR) .................. 10-2022-0064183

(51) Int. Cl.
*H04W 48/12*   (2009.01)
*H04W 48/16*   (2009.01)
(Continued)

(52) U.S. Cl.
CPC ............ *H04W 48/16* (2013.01); *H04W 84/12* (2013.01)

(58) Field of Classification Search
CPC ..... H04W 48/16; H04W 48/18; H04W 84/12; H04W 88/06; H04B 1/005; H04B 3/00; H04B 13/00
(Continued)

(56) References Cited

U.S. PATENT DOCUMENTS 7,567,820 B2    7/2009  Bitran et al.
8,185,129 B2    5/2012  Alizadeh-Shabdiz
(Continued)

FOREIGN PATENT DOCUMENTS

CN    205247596 U    5/2016
CN    104797011 B   11/2018
(Continued)

OTHER PUBLICATIONS

IP.com search history (Year: 2025).*
(Continued)

*Primary Examiner* — Moustapha Diaby
(74) *Attorney, Agent, or Firm* — Sughrue Mion, PLLC

(57) ABSTRACT

Provided is an electronic device including a communication module configured to exchange data with an external device, in which the communication module includes a first core and a second core, a memory storing instructions, and a processor configured to execute the instructions to determine first channels to be scanned by the first core and second channels to be scanned by the second core, scan the first channels by using the first core, scan the second channels by using the second core, determine third channels to be scanned by the first core and fourth channels to be scanned by the second core, based on a non-PSC detected based on at least one of the first channels and the second channels, scan the third
(Continued)

channels by using the first core, and scan the fourth channels by using the second core.

20 Claims, 18 Drawing Sheets

(51) Int. Cl.
  *H04W 48/18* (2009.01)
  *H04W 48/20* (2009.01)
  *H04W 88/06* (2009.01)
  *H04W 84/12* (2009.01)

(58) Field of Classification Search
  USPC .......................................................... 455/434
  See application file for complete search history.

(56) References Cited

U.S. PATENT DOCUMENTS

| | | | |
|---|---|---|---|
| 2007/0060125 A1 | 3/2007 | Rahim | |
| 2007/0105552 A1* | 5/2007 | Hun | H04W 48/16 |
| | | | 455/434 |
| 2010/0111006 A1 | 5/2010 | Zhai et al. | |
| 2010/0234021 A1 | 9/2010 | Ngai et al. | |
| 2014/0376392 A1* | 12/2014 | Hegde | H04W 48/08 |
| | | | 370/252 |
| 2016/0198326 A1* | 7/2016 | Shmidt | H04W 8/005 |
| | | | 455/434 |
| 2020/0015140 A1* | 1/2020 | Nam | H04W 36/0061 |
| 2020/0112910 A1* | 4/2020 | Cherian | H04W 72/0446 |
| 2020/0154322 A1 | 5/2020 | Liu et al. | |
| 2020/0288268 A1* | 9/2020 | Yoo | G01S 5/02521 |
| 2022/0345991 A1* | 10/2022 | Changlani | H04W 48/10 |

FOREIGN PATENT DOCUMENTS

| | | |
|---|---|---|
| CN | 105848231 B | 5/2019 |
| KR | 10-2011-0136857 A | 12/2011 |
| KR | 10-1252320 B1 | 4/2013 |
| KR | 10-1490146 B1 | 2/2015 |
| KR | 10-2019-0010882 A | 1/2019 |
| KR | 10-2020-0107089 A | 9/2020 |
| WO | 2021/230538 A1 | 11/2021 |

OTHER PUBLICATIONS

Asterjadhi et al., "MAC-CR-Miscellaneous CIDs in Subclause 26dot17", IEEE 802.11-20/0450r3, Mar. 2020, 18 total pages, XP068167506.
Communication dated Nov. 18, 2024, issued by European Patent Office in European Patent Application No. 22904732.9.
International Search Report (PCT/ISA/210) issued by the International Searching Authority on Jan. 27, 2023 in International Application No. PCT/KR2022/095149.

* cited by examiner

METHOD AND ELECTRONIC DEVICE FOR SCANNING CHANNELS IN FREQUENCY BANDS

CROSS-REFERENCE TO RELATED APPLICATIONS

This application is a continuation application of PCT International Application No. PCT/KR2022/095149 designating the United States, filed on Oct. 27, 2022, in the Korean Intellectual Property Receiving Office and claiming priority to Korean Patent Application No. 10-2021-0176259, filed on Dec. 10, 2021, and Korean Patent Application No. 10-2022-0064183, filed on May 25, 2022, in the Korean Intellectual Property Office, the disclosures of which are incorporated herein by reference in their entireties.

BACKGROUND

1. Field

The disclosure relates to an electronic device and method for scanning channels in various frequency bands

2. Description of Related Art

A wireless local area network (WLAN) may be also referred to as a wireless LAN or Wi-Fi and may refer to a system for establishing a network environment from a hub to each terminal by using a wireless frequency or light instead of a wire cable in an outdoor environment or an indoor environment, which is limited to a space or a building, such as an office, a shopping center, or a house. The WLAN may not need wiring and may enable easy relocation of terminals, mobile communication, and network establishment in a short time. In addition, the WLAN is used for various services in various fields because the WLAN enables a large amount of data to be transmitted and received with a low transmission delay.

SUMMARY

Increased use of a wireless local area network (WLAN) has recently saturated the 2.4 GHz and 5 GHz frequency bands. Accordingly, various countries have permitted or are considering permitting a 6 GHz frequency band as an unlicensed band.

An example embodiment of the disclosure may provide an electronic device for scanning channels in various frequency bands, and a method thereof.

However, the technical aspects are not limited to the foregoing aspects, and there may be other technical aspects.

According to an aspect of the disclosure, an electronic device includes a communication module configured to exchange data with an external device, where the communication module includes a first core and a second core; a memory storing instructions; and at least one processor configured to execute the instructions to: determine first channels to be scanned by the first core and second channels to be scanned by the second core, scan the first channels by using the first core for a first time, scan the second channels by using the second core for a second time, determine third channels to be scanned by the first core and fourth channels to be scanned by the second core, based on a non-preferred scanning channel (PSC) detected based on at least one of the first channels and the second channels, scan the third channels by using the first core for a third time after the first time, and scan the fourth channels by using the second core for a fourth time after the second time.

The at least one processor includes a communication processor (CP) in the communication module or an application processor (AP) of the electronic device.

The first channels include one or more channels in a 2.4 GHz band, and the second channels include one or more channels in a 5 GHz band.

The third channels include one or more channels, different from the second channels, in the 5 GHz band, and the fourth channels include one or more PSCs in a 6 GHz band. The fourth channels may additionally include one or more non-PSCs in the 6 GHz band.

The first time and the second time at least partially overlap each other, and the third time and the fourth time at least partially overlap each other.

The at least one processor is further configured to execute the instructions to: determine the first channels and the second channels, based on a preset expected number of non-PSCs.

The at least one processor is further configured to execute the instructions to: determine the third channels and the fourth channels such that a difference between an end of the third time and an end of the fourth time is minimized.

The at least one processor is further configured to execute the instructions to: determine preliminary third channels to be scanned by the first core and preliminary fourth channels to be scanned by the second core; and determine the third channels and the fourth channels by adjusting the preliminary third channels and the preliminary fourth channels, based on the number of detected non-PSCs.

The at least one processor is further configured to execute the instructions to: detect an additional non-PSC by scanning the third channels or the fourth channels; and scan the additional non-PSC by using at least one of the first core and the second core.

The electronic device of claim 1, wherein the electronic device includes a mobile communication terminal.

According to an aspect of the disclosure, a method for scanning channels in various frequency bands includes: determining first channels to be scanned by a first core of a communication module and second channels to be scanned by a second core of the communication module; scanning the first channels by using the first core for a first time; scanning the second channels by using the second core for a second time; determining third channels to be scanned by the first core and fourth channels to be scanned by the second core, based on a non-preferred scanning channel (PSC) detected based on at least one of the first channels and the second channels; scanning the third channels by using the first core for a third time after the first time; and scanning the fourth channels by using the second core for a fourth time after the second time.

The first channels include one or more channels in a 2.4 GHz band, and the second channels include one or more channels in a 5 GHz band.

The third channels include one or more channels, different from the second channels, in the 5 GHz band, and the fourth channels include one or more PSCs in a 6 GHz band. The fourth channels may additionally include one or more non-PSCs in the 6 GHz band.

The first time and the second time at least partially overlap each other, and the third time and the fourth time at least partially overlap each other.

The determining the first channels to be scanned by the first core and the second channels to be scanned by the second core includes: determining the first channels and the second channels, based on a preset expected number of non-PSCs.

The determining the first channels to be scanned by the first core and the second channels to be scanned by the second core includes: determining the third channels and the fourth channels such that a difference between an end of the third time and an end of the fourth time is minimized.

The method further includes: detecting an additional non-PSC by scanning the third channels or the fourth channels; and scanning the additional non-PSC by using at least one of the first core and the second core.

According to an aspect of the disclosure, an electronic device includes a communication module configured to exchange data with an external device, where the communication module includes a first core and a second core; a memory storing instructions; and at least one processor configured to execute the instructions to: determine one or more target frequency bands available to the electronic device, based on a geographic region of the electronic device, determine channels available in the at least one target frequency band, when a preset frequency band is not available based on the target frequency bands, determine first channels and third channels to be scanned by the first core and second channels to be scanned by the second core, scan the first channels by using the first core for a first time, scan the second channels by using the second core for a second time, and scan the third channels by using the first core for a third time.

However, the technical aspects are not limited to the foregoing aspects, and there may be other technical aspects.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
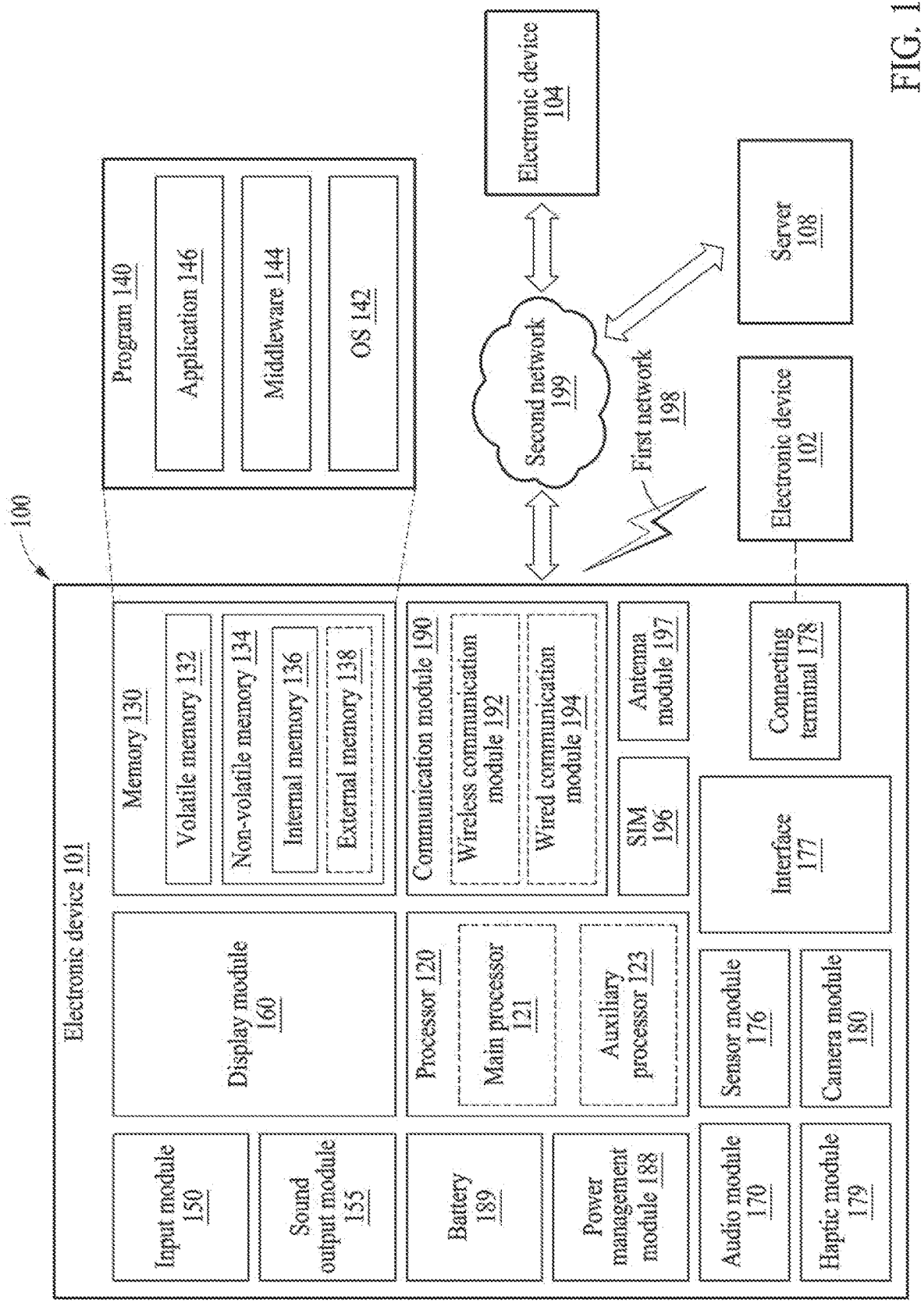
FIG. 1 is a block diagram illustrating an electronic device in a network environment, according to an example embodiment.

Hereinafter, example embodiments of the present disclosure will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a nonvolatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display module 160 may include a touch sensor adapted to detect a touch, or a pressure sensor adapted to measure the intensity of force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to an example embodiment, the antenna module 197 may form a mmWave antenna module. According to an example embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an example embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

The electronic device according to an example embodiment may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that an example embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with an example embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

An example embodiment as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly.

If distributed online, at least part of the computer program product may be temporarily generated or at least temporarily stored in the machine-readable storage medium, such as a memory of the manufacturer's server, a server of the application store, or a relay server.

According to an example embodiment, each component (e.g., a module or a program) of the above-described components may include a single entity or multiple entities, and some of the multiple entities may be separately disposed in different components. According to an example embodiment, one or more of the above-described components may be omitted, or one or more other components may be added. Alternatively or additionally, a plurality of components (e.g., modules or programs) may be integrated into a single component.

In such a case, according to an example embodiment, the integrated component may still perform one or more functions of each of the plurality of components in the same or similar manner as they are performed by a corresponding one of the plurality of components before the integration. According to an example embodiment, operations performed by the module, the program, or another component may be carried out sequentially, in parallel, repeatedly, or heuristically, or one or more of the operations may be executed in a different order or omitted, or one or more other operations may be added.

Figure 2:
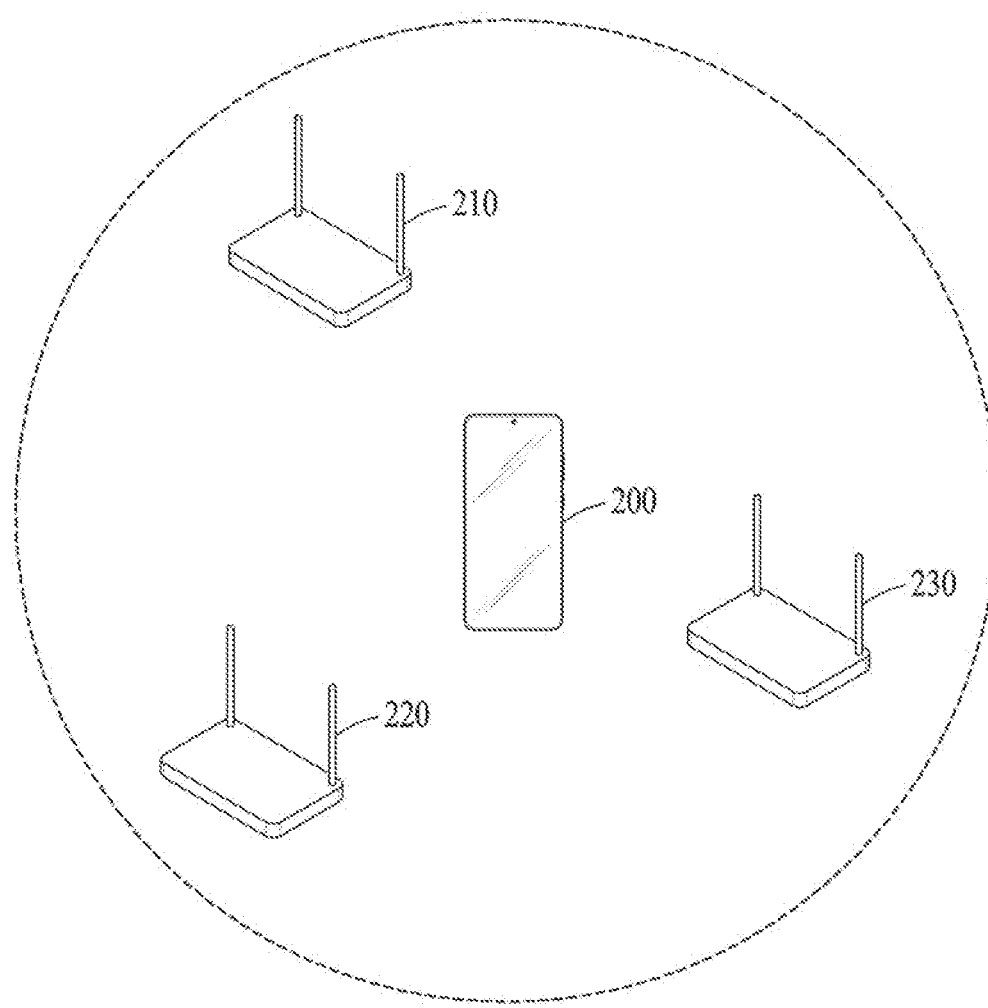
FIG. 2 is a diagram illustrating a positional relationship between an electronic device and hub devices, according to an example embodiment.

FIG. 2 is a diagram illustrating a positional relationship between an electronic and hub devices, according to an example embodiment.

An electronic device 200 (e.g., the electronic device 101 of FIG. 1) of FIG. 2 may scan channels in frequency bands used by hub devices 210, 220, and 230 around the electronic device 200 and identify the hub devices 210, 220, and 230. The electronic device 200, by using detected channels, may communicate with the hub devices 210, 220, and 230. For example, each of the hub devices 210, 220, and 230 may be an access point (AP). Some of the hub devices 210, 220, and 230 may be another electronic device.

In an example embodiment, each of the hub devices 210, 220, and 230 may use channels in frequency bands different from one another, and accordingly, the electronic device 200 may scan a plurality of channels to detect the hub devices 210, 220, and 230. For example, the frequency bands used by the hub devices 210, 220, and 230 may include 2.4 GHZ, 5 GHZ, and 6 GHz bands.

In an example embodiment, when a communication module (e.g., the communication module 190 of FIG. 1) of the electronic device 200 includes a plurality of cores, the electronic device 200 may scan the plurality of channels at the same time through the plurality of cores. For example, when the communication module includes a first core and a second core, the first core may scan 2.4 GHz and 5 GHz bands and the second core may scan 5 GHz and 6 GHz bands. The total time of scanning all the channels may decrease when the electronic device 200 scans the plurality of channels at the same time through the plurality of cores instead of scanning the channels through one core. For example, the first core and the second core may simultaneously scan the 2.4 GHz and 5 GHz bands, and then, the first core and the second core may simultaneously scan the 5 GHz and 6 GHz bands.

In an example embodiment, bands to be scanned may vary depending on a wireless communication policy of a country (or a geographic region) where the electronic device 200 operates.

For example, when the electronic device 200 operates in a country which permits the use of 2.4 GHZ, 5 GHZ, and 6 GHz bands, the first core of the electronic device 200 may scan the 2.4 GHz and 5 GHz bands and the second core of the electronic device 200 may scan the 5 GHz and 6 GHz bands. A method of simultaneously scanning the plurality of channels in 2.4 GHZ, 5 GHZ, and 6 GHz bands is described below in detail with reference to FIGS. 5 to 11.

In another example, when the electronic device 200 operates in a country which permits the use of 2.4 GHZ, 5 GHZ, and 6 GHz bands, the first core and the second core of the electronic device 200 each may scan the 2.4 GHZ, 5 GHZ, and 6 GHz bands. A method of simultaneously scanning the plurality of channels in 2.4 GHZ, 5 GHZ, and 6 GHz bands is described below in detail with reference to FIGS. 12 and 13.

Yet another example, when the electronic device 200 operates in a country which permits the use of 2.4 GHz and 5 GHz bands but not use of a 6 GHz band, the first core of the electronic device 200 may scan the 2.4 GHz and 5 GHz bands and the second core of the electronic device 200 may scan the 5 GHz band. A method of simultaneously scanning the plurality of channels in 2.4 GHz and 5 GHz bands is described below in detail with reference to FIGS. 14, 15, and 16.

Figure 3A:
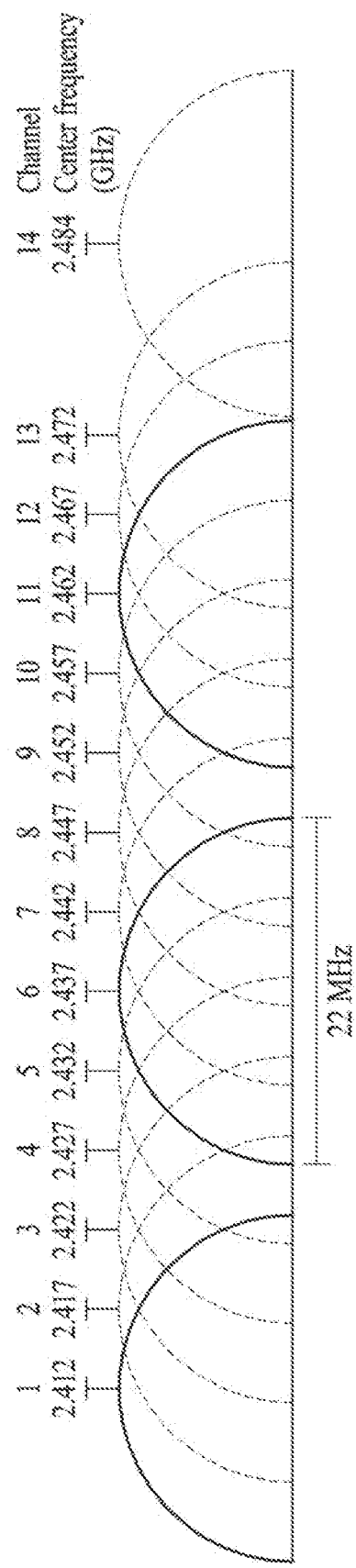
FIG. 3A is a diagram illustrating channels in a 2.4 GHz band, according to an example embodiment.

FIG. 3A is a diagram illustrating channels in a 2.4 GHz band, according to an example embodiment.

In an example embodiment, 14 channels may be allocated to the 2.4 GHz band. Each of the channels in the 2.4 GHz band may have a 22 MHz bandwidth, based on the center frequency of each of the channels. For example, channel 1 in the 2.4 GHz band may have a 22 MHz bandwidth with the center frequency of channel 1 being 2.412 MHz.

Active scanning may be performed on the channels in the 2.4 GHz band. The active scanning may include an electronic device propagating a probe request around the electronic device and the electronic device waiting to receive a probe response to the probe request.

Figure 3B:
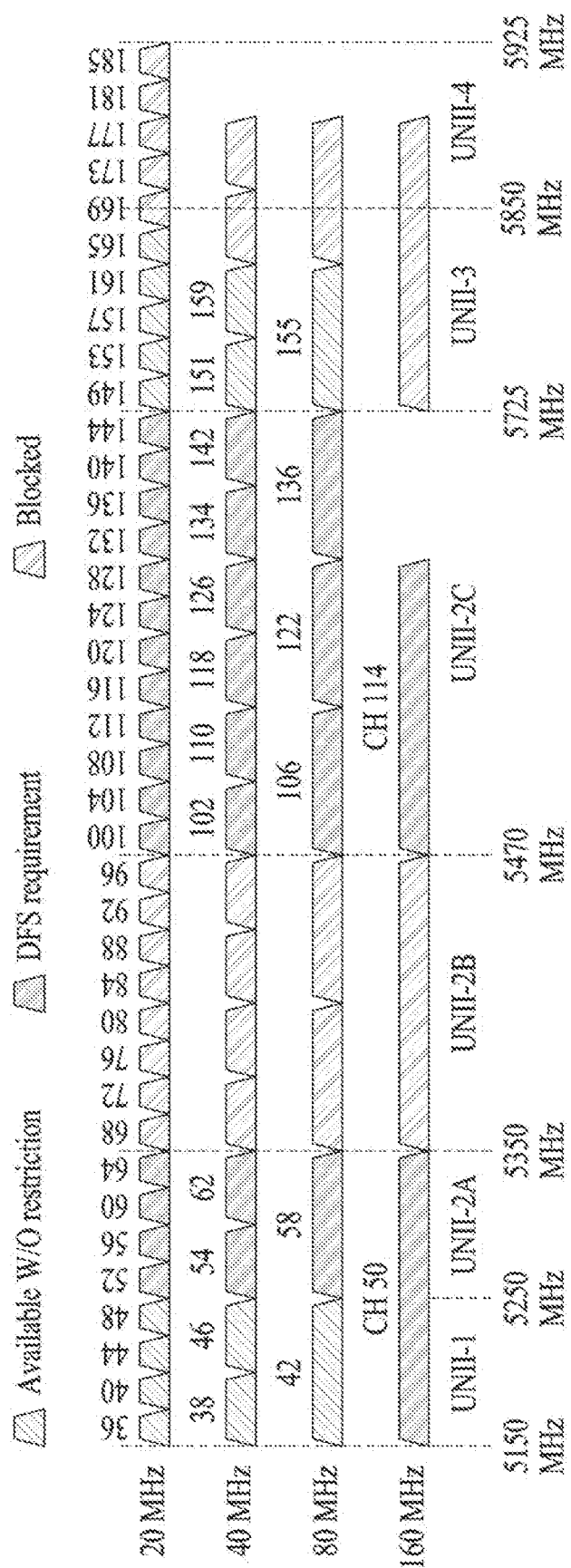
FIG. 3B is a diagram illustrating channels in a 5 GHz band, according to an example embodiment.

FIG. 3B is a diagram illustrating channels in a 5 GHz band, according to an example embodiment.

In an example embodiment, channels with 20 MHz, 40 MHz, 80 MHz, and 160 MHz bandwidths may be allocated to the 5 GHz band. The channels may be classified according to a purpose of use. For example, the channels may be a channel available without restriction, a channel requiring dynamic frequency selection (DFS), and a blocked channel. The DFS-requiring channel may be a channel not available for a purpose of general communication when the channel is used for a designated purpose, such as a military radar, satellite communication, or a weather radar, and may be a channel available for the purpose of general communication when it is verified that the channel is not used for the designated purpose.

In the 5 GHz band, active scanning may be performed on channels 36, 40, 44, 48, 149, 153, 157, 161, and 165, which are WLAN channels, and passive scanning may be performed on channels 52, 56, 60, 64, 100, 104, 108, 112, 116, 120, 124, 128, 132, 136, 140, and 144, which are DFS channels. The passive scanning may include an electronic device not propagating a probe request and the electronic device waiting to receive a beacon signal transmitted from a hub device.

Figure 3C:
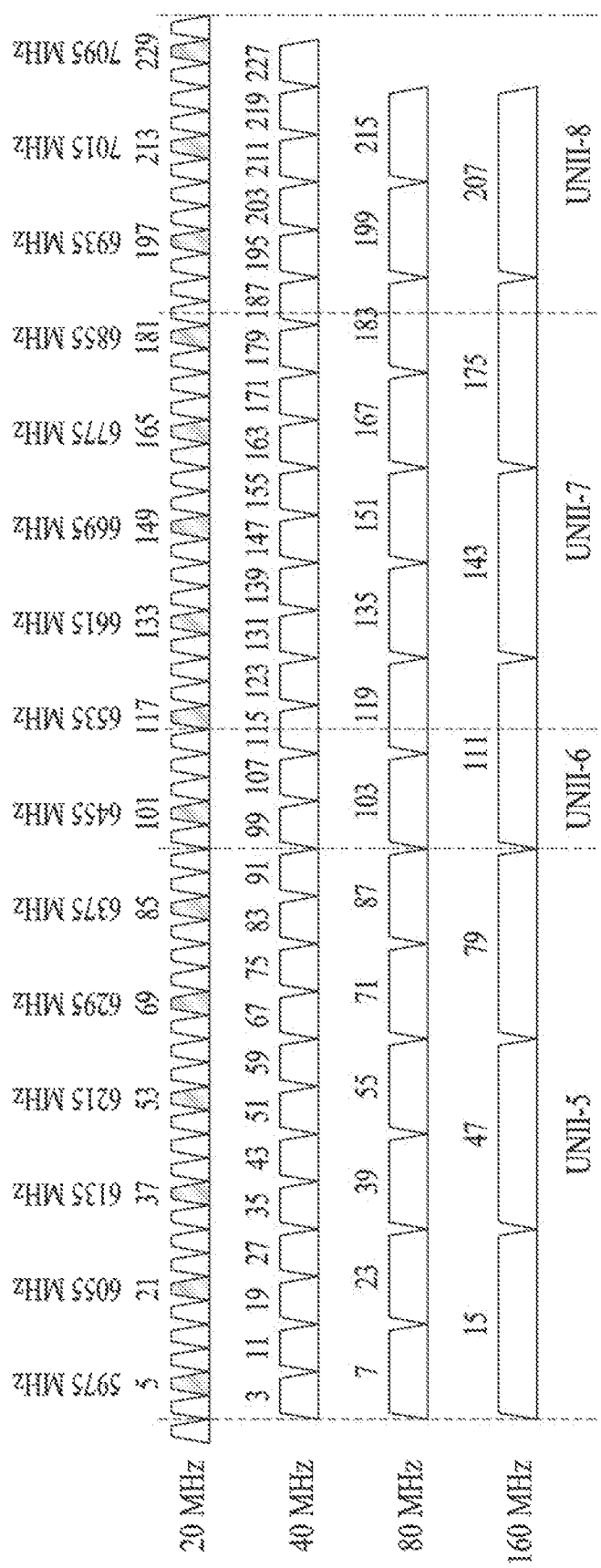
FIG. 3C is a diagram illustrating channels in a 6 GHz band, according to an example embodiment.

FIG. 3C is a diagram illustrating channels in a 6 GHz band, according to an example embodiment.

In an example embodiment, channels with 20 MHz, 40 MHz, 80 MHz, and 160 MHz bandwidths may be allocated to the 6 GHz band. For example, the 6 GHz band may include some (e.g., a band after 5925 MHZ) of 5 GHz and some (e.g., a band before 7125 MHz) of 7 GHZ.

The channels with the 20 MHz bandwidth may be classified into a PSC or a non-PSC. The PSC may be a set of fifteen 20 MHz channels spaced apart from one another at an 80 MHz interval. For example, a hub device (e.g., the hub devices 210, 220, and 230 of FIG. 2) may match a basic channel with the PSC such that the electronic device 200 may easily detect a channel. For example, the PSC may include channels 5, 21, 37, 53, 69, 85, 101, 117, 133, 149, 169, 181, 197, 213, and 229. The rest of the channels excluding the PSC may be a non-PSC.

In an example embodiment, for the channels in the 6 GHZ, based on a fast initial link setup (FILS) discovery frame, a reduced neighbor report, or a neighbor report element, whether a channel has an AP operating in the channel may be determined, and when the channel has an AP operating in the channel, active scanning may be performed on the channel.

In another example embodiment, passive scanning may be performed on the channels in the 6 GHz band for at least 20 milliseconds (ms), and then, active scanning may be performed thereon.

Figure 4:
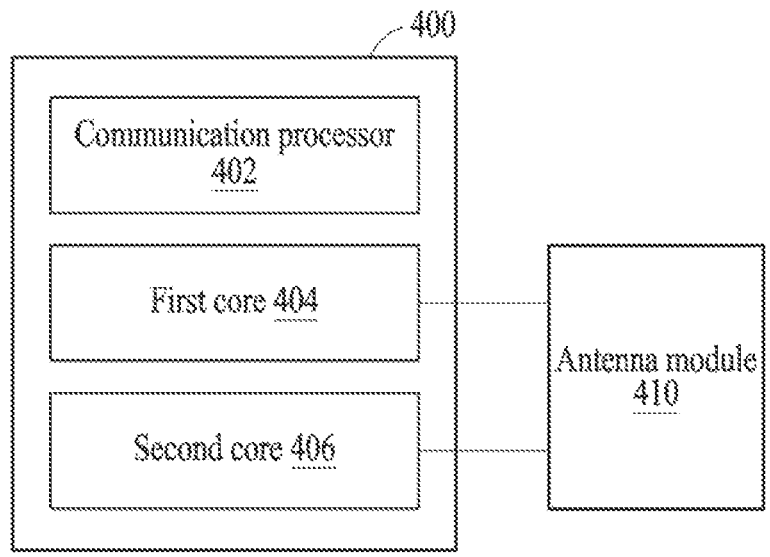
FIG. 4 is a block diagram illustrating a communication module including a plurality of cores, according to an example embodiment.

FIG. 4 is a block diagram illustrating a communication module including a plurality of cores, according to an example embodiment.

An electronic device (e.g., the electronic device 101 of FIG. 1 or the electronic device 200 of FIG. 2) may include a communication module 400 (e.g., the communication module 190 of FIG. 1). For example, the communication module 400 may include a CP and a plurality of cores, that is, a first core 404 and a second core 406. The communication module 400 may include a Wi-Fi chip and/or a Bluetooth chip.

In an example embodiment, the first core 404 and the second core 406 may connect to an antenna module 410 (e.g., the antenna module 197 of FIG. 1). The communication module 400 may transmit or receive a signal or power to or from the outside (e.g., an external electronic device) of the communication module 400 through the first core 404, the second core 406, and the antenna module 410.

In an example embodiment, a CP 402 may control the first core 404 and the second core 406 and scan channels in a frequency band. A method of scanning the channels in the frequency band by using a plurality of cores is described below in detail with reference to FIGS. 5 to 10.

Figure 5:
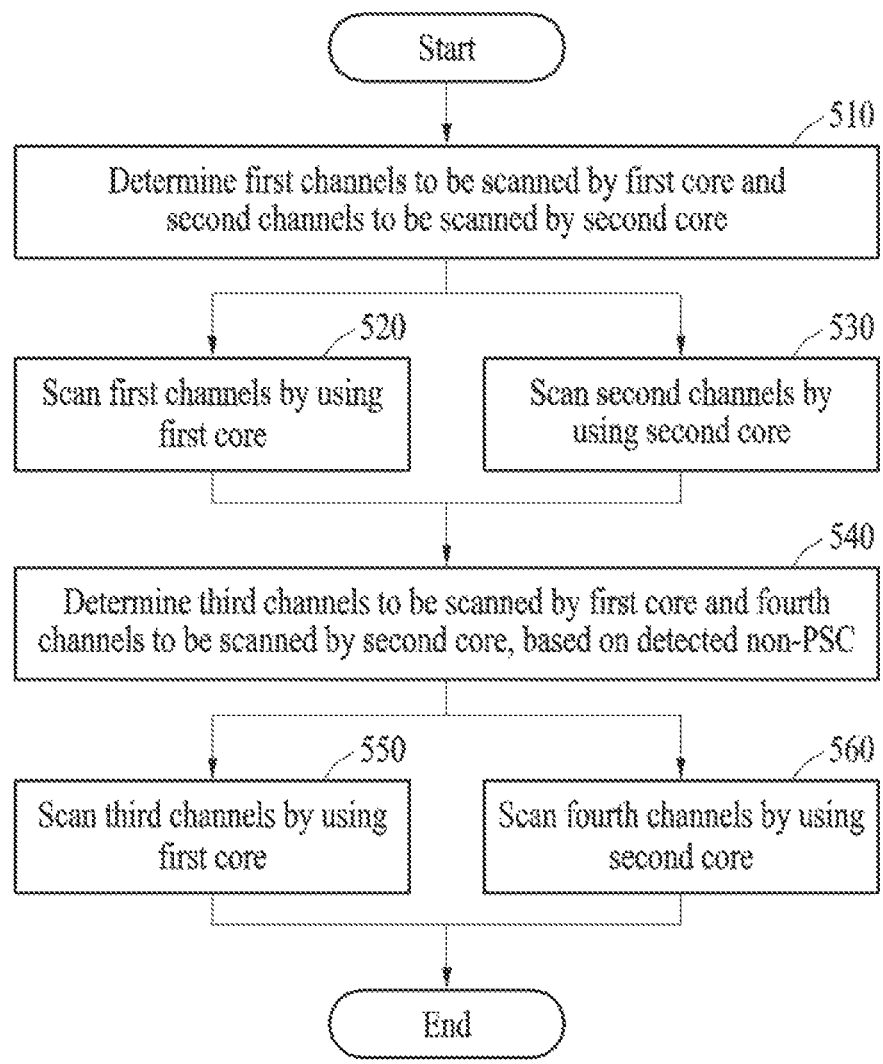
FIG. 5 is a flowchart illustrating a method of scanning a plurality of channels, according to an example embodiment.

FIG. 5 is a flowchart illustrating a method of scanning a plurality of channels, according to an example embodiment.

An electronic device (e.g., the electronic device 101 of FIG. 1 or the electronic device 200 of FIG. 2) may perform operations 510 to 560.

In an example embodiment, an AP (e.g., the main processor 121 of FIG. 1) of the electronic device may perform operations 510 to 560.

In an example embodiment, a CP (e.g., the CP 402 of FIG. 4) of a communication module (e.g., the communication module 190 of FIG. 1 or the communication module 400 of FIG. 4) of the electronic device may perform operations 510 to 560.

Before performing operation 510, the electronic device may determine an available frequency band and determine all channels to be scanned in the determined frequency band. For example, an available frequency band and channels in the available frequency band may vary depending on the country.

In operation 510, the electronic device may determine first channels in frequency bands to be scanned by a first core (e.g., the first core 404 of FIG. 4) and second channels in frequency bands to be scanned by a second core (e.g., the second core 406 of FIG. 4). For example, the first channels may include at least some of channels in a 2.4 GHz band and the second channels may include at least some of channels in a 5 GHz band, but channels included by the first channels and the second channels may not be limited to the foregoing examples.

In an example embodiment, the electronic device may classify all the channels into four channel groups in advance. For example, the electronic device may classify all the channels into four channel groups, based on a scanning time of each channel. A first channel group may be the first channels, and a second channel group may be the second channels. The first channels and the second channels may be simultaneously scanned, and the scanning of the first channels and the second channels may be referred to as a first scan. After the first scan ends in each of the first core and the second core, third channels and fourth channels may be scanned simultaneously and the scanning of the third channels and the fourth channels may be referred to as a second scan. When the first channels, the second channels, the third channels, and the fourth channels are properly distributed, the time needed for the first scan and the second scan may decrease.

In an example embodiment, the third channels and the fourth channels determined in operation 510 may respectively referred to as preliminary third channels and preliminary fourth channels. For example, the preliminary third channels may include the channels in the 5 GHz band that are not included by the second channels and the preliminary fourth channels may include channels in a 6 GHz band. The preliminary third channels may include one or more channels, different from the second channels, in the 5 GHz band, and the preliminary fourth channels may include one or more PSCs in the 6 GHz band.

A method of determining final third channels and final fourth channels after the first scan is described below in detail with reference to FIGS. 7, 8, and 9.

In operation 520, the electronic device may scan the first channels by using the first core. For example, the first channels may be scanned for a first time.

In an example embodiment, when the first channels are 13 channels in the 2.4 GHz band, active scanning may be performed on 13 channels. For example, the active scanning time may be preset to 80 ms but may not be limited thereto. When a scanning time for each channel is 80 ms, the time needed for the first scan by the first core may be 13×80 ms=1.04 seconds (sec).

In operation 530, the electronic device may scan the second channels by using the second core. For example, the second channels may be scanned for a second time. The first time and the second time may have the same start time and at least partially overlap each other.

In an example embodiment, the second channels may be some (e.g., 10 channels) of the channels in the 5 GHz band. For example, the second channels may include channels 128, 132, 136, 140, 144, 149, 153, 157, 161, and 165. When the channels are DFS channels, passive scanning may be performed, and when the channels are not DFS channels, active scanning may be performed. In the 5 GHz band, the active scanning may be performed on channels 149, 153, 157, 161, and 165 and the passive scanning may be performed on channels 128, 132, 136, 140, and 144, which are DFS channels.

For example, the passive scanning time may be preset to 110 ms but may not be limited thereto.

For example, the active scanning time may be preset to 80 ms and the passive scanning time may be preset to 110 ms, but a scanning time may not be limited to the foregoing examples.

In this case, the time needed for the first scan by the second core may be (5×80 ms)+ (5×110 ms)=0.95 sec.

In an example embodiment, an end time of the first scan by the first core may be different from an end time of the first scan by the second core.

In operation 540, when the electronic device obtains information on a non-PSC through the first scan, based on a detected non-PSC, the electronic device may determine the third channels to be scanned by the first core and the fourth channels to be scanned by the second core.

In an example embodiment, when a hub device simultaneously uses a plurality of channels in different bands (e.g., the 2.4 GHZ (or 5 GHZ) band and the 6 GHz band), the hub device may include information on a channel in the 6 GHz band in information (e.g., a beacon or a probe response) transmitted through a channel in the 2.4 GHz (or 5 GHZ) band. The electronic device may obtain information on a target channel in the 6 GHz band, based on information on the channel in the 2.4 GHz (or 5 GHZ) band. The target channel may be a non-PSC. For example, the number of non-PSCs may increase when information on an AP operating in a non-PSC in the 6 GHz band is obtained in a reduced neighbor report (RNR) field included in a management frame, such as a beacon or a probe response, through an out-of-band (OOB) discovery.

In an example embodiment, the electronic device may classify, into two groups, non-PSCs and channels that are not scanned through the first scan among all the channels to be scanned and determine third channels and fourth channels. For example, when scanning the third channels for a third time and the fourth channels for a fourth time, the electronic device may determine the third channels and the fourth channels such that a difference between the end of the third time and the end of the fourth time may be minimized. A method of determining the third channels and the fourth channels is described below in detail with reference to FIG. 7.

In an example embodiment, the third channels may include channels 36, 40, 44, 48, 52, 56, 60, 64, 100, 104, 108, 112, 116, and 120 that are in the 5 GHz band and the fourth channels may include channel 124 in the 5 GHz band, channels 5, 21, 37, 53, 69, 85, 101, 117, 133, 149, 165, 181, 197, 213, and 229 in the 6 GHz band, and detected three non-PSCs in the 6 GHz band. In this case, an end time of a second scan by the first core may be 2.46 sec and an end time of the second scan by the second core may be 2.5 sec.

The electronic device may determine the third channels and the fourth channels such that the end time of the second scan by the first and second cores may be minimized, and when the number of detected non-PSCs is different from the foregoing example, channels respectively included in the third and fourth channels may vary. A description on the third channels and the fourth channels that vary depending on the number of detected non-PSCs may be provided in detail with reference to FIGS. 8 and 9.

In operation 550, the electronic device may scan the third channels by using the first core. For example, the third channels may be scanned for the third time. The scanning of the third channels by the first core may be referred to as the second scan.

In operation 560, the electronic device may scan the fourth channels by using the second core. For example, the fourth channels may be scanned for the fourth time. The scanning of the fourth channels by the second core may be referred to as the second scan. The third time and the fourth time may partially overlap each other.

In an example embodiment, the electronic device may detect a hub device or another electronic device by scanning the first, second, third, and fourth channels and may perform wireless communication with the hub device or the other electronic device.

Figure 6:
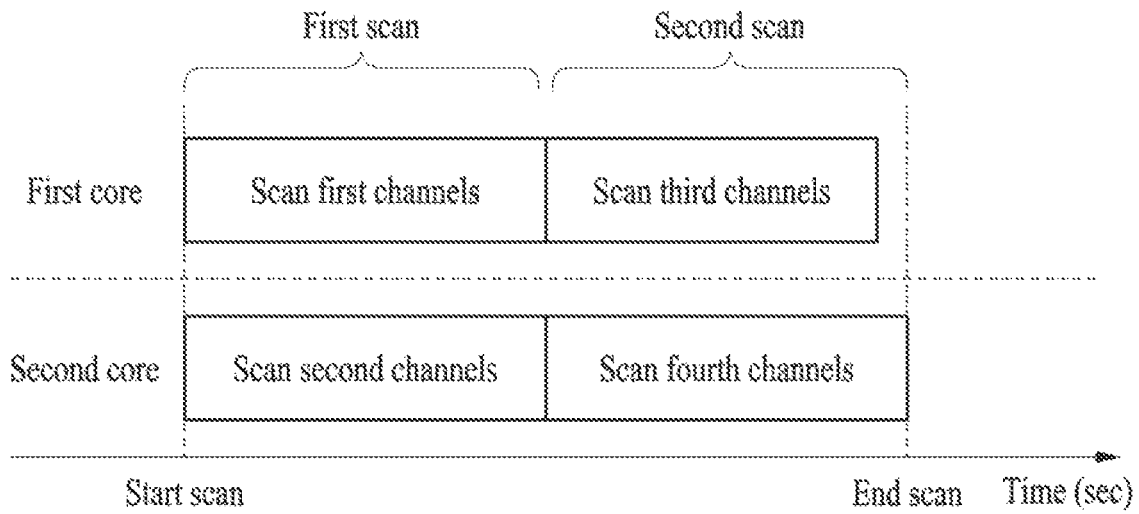
FIG. 6 is a diagram illustrating a method of scanning a plurality of channels through a plurality of cores, according to an example embodiment.

FIG. 6 is a diagram illustrating a method of scanning a plurality of channels through a plurality of cores, according to an example embodiment.

In an example embodiment, an electronic device (e.g., the electronic device 101 of FIG. 1 or the electronic device 200 of FIG. 2) may predetermine first channels, second channels, third channels, and fourth channels such that an end time of a second scan by each core may be minimized.

For example, based on an expected number of non-PSCs, the electronic device may determine the first, second, third, and fourth channels before performing a first scan. For example, the expected number may be n including 0. When the expected number is 0, the electronic device may determine the first, second, third, and fourth channels excluding non-PSCs.

Figure 7:
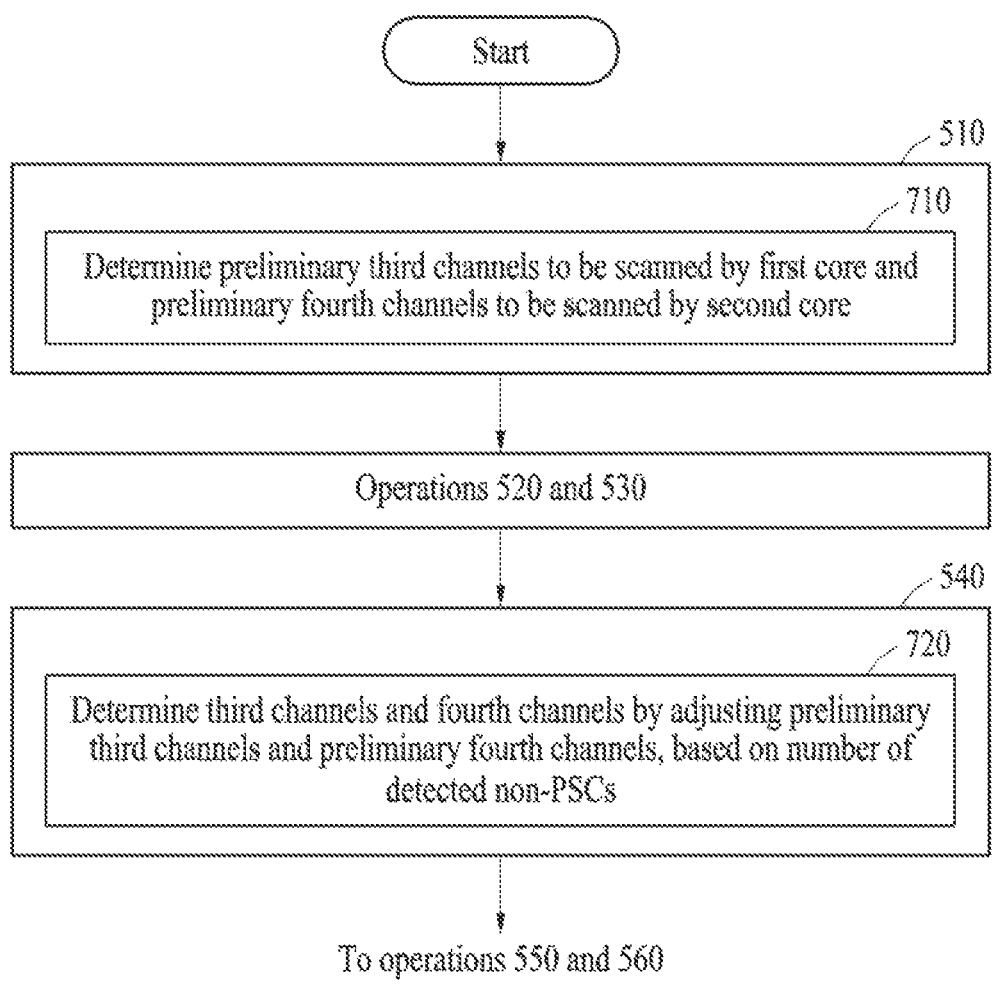
FIG. 7 is a diagram illustrating a method of determining third channels and fourth channels, based on the number of detected non-preferred scanning channels (PSCs), according to an example embodiment.

FIG. 7 is a diagram illustrating a method of determining third channels and fourth channels, based on the number of detected non-PSCs, according to an example embodiment.

In an example embodiment, operation 510 described above with reference to FIG. 5 may include operation 710.

In operation 710, the electronic device may determine preliminary third channels to be scanned by a first core and preliminary fourth channels to be scanned by a second core. In an example embodiment, the electronic device may determine the preliminary third channels and the preliminary fourth channels, based on a preset expected number of non-PSCs.

For example, when the preset expected number of non-PSCs is 0, the preliminary third channels and the preliminary fourth channels may be determined based on Equations 1 to 4 below.

First core scan time=$N_{2g} \times A_{2g} + (N_{5g,nonDFS}-i) \times A_{5g} + (N_{5g,DFS}-j) \times P_{5g}$ [Equation 1]

Second core scan time=$i \times A_{5g} + j \times P_{5g} + N_{6g,PSC} \times S_{6g}$ In Equations 1 and 2, $N_{2g}$ may be the number of channels in a 2.4 GHz band, $A_{2g}$ may be a time of active scanning of the channels in the 2.4 GHz band, $N_{5g}$,nonDFS may be the number of non-DFS channels in a 5 GHz band, Asg may be a time of active scanning of channels in the 5 GHz band, Psg may be a time of passive scanning of the channels in the 5 GHz band, $N_{6g,PSC}$ may be the number of PSCs in a 6 GHz band, and Sog may be a time of scanning channels in the 6 GHz band. i may be the number of non-DFS channels included in second channels among the channels in the 5 GHz band, and j may be the number of DFS channels included in the second channels among the channels in the 5 GHz band. i and j may be determined based on Equation 3 below.

$$i, j = \min_{i,j}\{\max$$
$$\{(N_{2g} \times A_{2g} + (N_{5g,nonDFS}-i) \times A_{5g} + (N_{5g,DFS}-j) \times P_{5g}),$$
$$(i \times A_{5g} + j \times P_{5g} + N_{6g,PSC} \times S_{6g})\}\}$$ 
[Equation 3]

For example, under the assumption that $N_{2g}$=13, $A_{2g}$=80 ms, $N_{5g}$,nonDFS=9, $A_{5g}$=80 ms, $N_{5g}$,DFS=16, $P_{5g}$=110 ms, $N_{6g}$,PSC=15, $S_{6g}$=80 ms, when i=5 and j=7, a total scanning time may be a minimum of 2.37 sec.

In another example, when the preset expected number of non-PSCs is Nog, nonPSC, i and j may be determined based on Equation 4.

$$i, j = \min_{i,j}\{\max$$
$$\{(N_{2g} \times A_{2g} + (N_{5g,nonDFS}-i) \times A_{5g} + (N_{5g,DFS}-j) \times P_{5g}),$$
$$(i \times A_{5g} + j \times P_{5g} + (N_{6g,PSC} + N_{6g,nonPSC}) \times S_{6g})\}\}$$
[Equation 4]

For example, when Nog.nonPSC is 5, a calculated result may be i=5 and j=5 and the total scanning time may be a minimum of 2.57 sec.

In an example embodiment, based on the determined i and j values, the electronic device may determine first channels, the second channels, the preliminary third channels, and the preliminary fourth channels. For example, when classifying the channels in the 5 GHz band into the second channels and third channels, the electronic device may include channels from channels in a 5 GHz band close to the 6 GHz band in the second channels. In this classification, interference between channels in the 6 GHz band and third channels in the 5 GHz band that are scanned through the second scan may decrease.

In an example embodiment, operation 540 described above with reference to FIG. 5 may include operation 720.

In operation 720, the electronic device may adjust the preliminary third channels and the preliminary fourth channels, based on the number of non-PSCs in the 6 GHz band that are detected through operations 520 and 530, and determine the third channels and fourth channels. The electronic device may determine the third channels and the fourth channels to include the detected non-PSCs. For example, some of the preliminary third channels may be changed to the fourth channels. In another example, some of the preliminary fourth channels may be changed to the third channels. Yet another example, the preliminary third channels and the preliminary fourth channels may respectively be included in the third channels and the fourth channels.

In an example embodiment, when the preset expected number of non-PSCs may be 5, the preliminary third channels and the preliminary fourth channels may be predetermined, based on i=5 and j=5. Then, when the three non-PSCs are detected through the first scan and when i and j are recalculated based on Equation 4, a calculated result may be i=5 and j=6. In this case, the preliminary third channels and the preliminary fourth channels may be adjusted such that the fourth channels may include one DFS channel, which has been included in the preliminary third channels. The fourth channels may include detected three non-PSCs.

Figure 8:
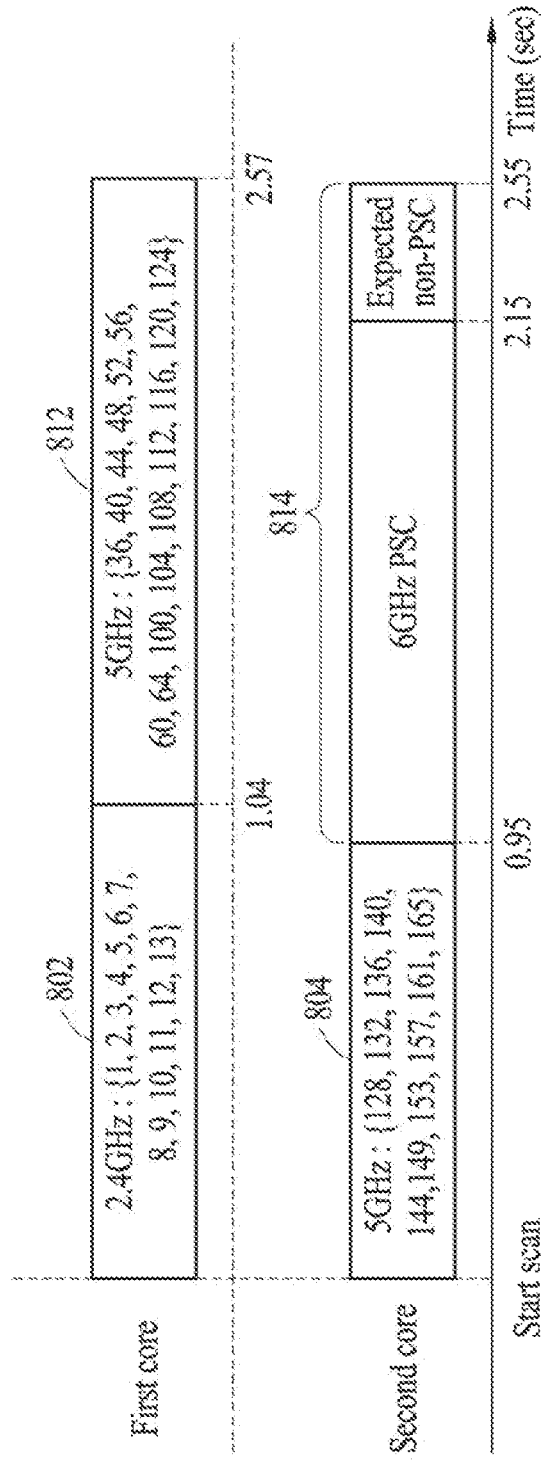
FIG. 8 is a diagram illustrating first channels, second channels, third channels, and fourth channels, according to an example embodiment.

FIG. 8 is a diagram illustrating first channels, second channels, third channels, and fourth channels, according to an example embodiment.

FIG. 8 illustrates first channels 802, second channels 804, third channels 812, and fourth channels 814 determined when the preset expected number of non-PSCs is 5. The third channels 812 and the fourth channels 814 may respectively be preliminary third channels and preliminary fourth channels.

For example, when the number of non-PSCs actually detected through a first scan of the first channels 802 and the second channels 804 is 5, the third channels 812 and the fourth channels 814 may not be adjusted for a second scan. The fourth channels 814 may include the detected non-PSCs.

Figure 9:
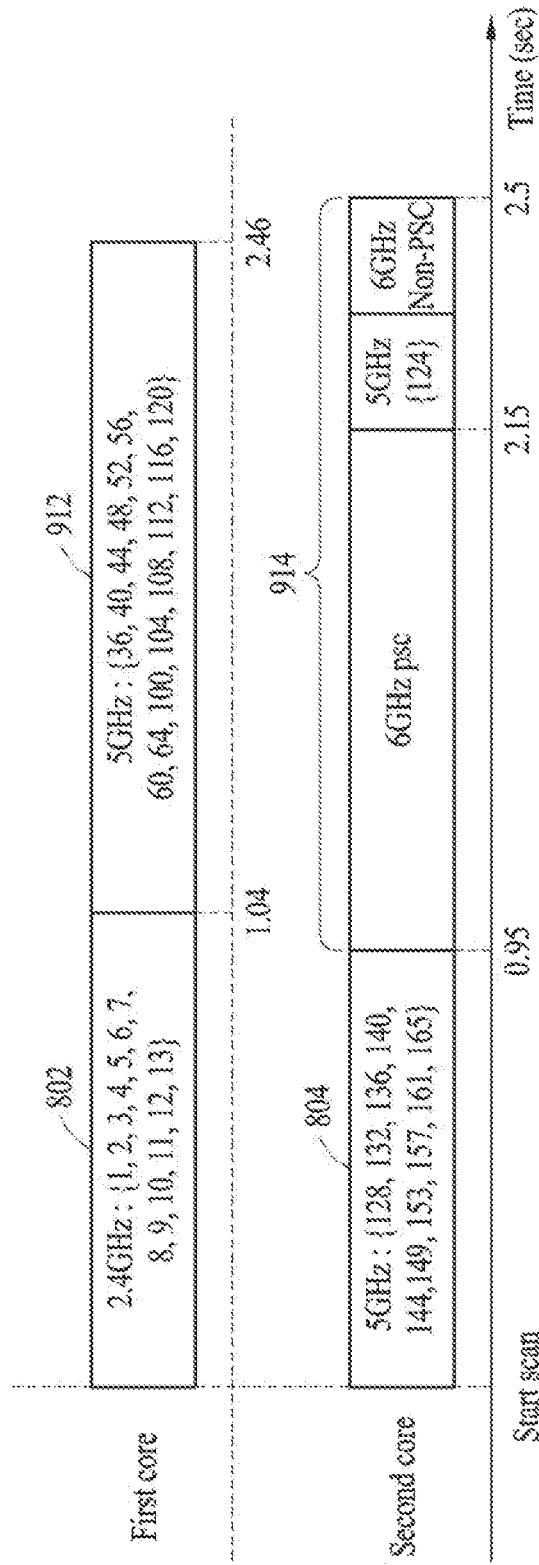
FIG. 9 is a diagram illustrating third channels and fourth channels adjusted based on a detected non-PSC, according to an example embodiment.

FIG. 9 is a diagram illustrating third channels and fourth channels adjusted based on a detected non-PSC, according to an example embodiment.

In an example embodiment, when a preset expected number of non-PSCs was 5 but the number of non-PSCs actually detected through a first scan is 3, an electronic device may adjust the third channels 812 and the fourth channels 814 and determine third channels 912 and fourth channels 914. For example, channel 124 in a 5 GHz band, which is a channel having the highest frequency among the third channels 812, may be moved to the fourth channels 914.

In an example embodiment, when one or more channels (e.g., channel 124 in the 5 GHz band) among the third channels 812 are moved to the fourth channels 914, the one or more channels may be in the fourth channels 914 such that channel 124 in the 5 GHz band may be scanned before or after a PSC in a 6 GHz band of the fourth channels 914, based on an end time of scanning the second channels 804.

Figure 10:
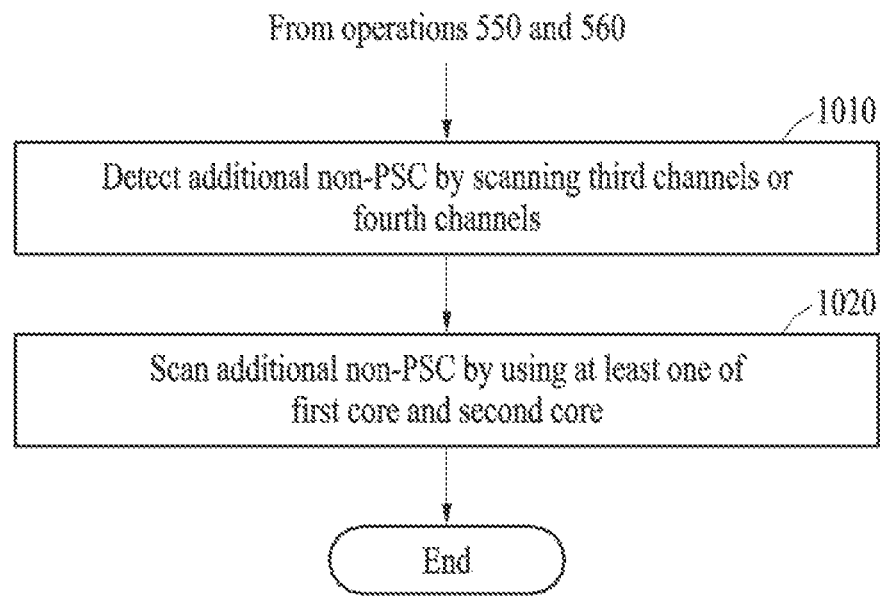
FIG. 10 is a flowchart illustrating a method of scanning a detected additional non-PSC, according to an example embodiment.

FIG. 10 is a flowchart illustrating a method of scanning a detected additional non-PSC, according to an example embodiment.

Operations 1010 and 1020 may be additionally performed after operations 550 and 560 described above with reference to FIG. 5. An electronic device (e.g., the electronic device 101 of FIG. 1 or the electronic device 200 of FIG. 2) may perform operations 1010 and 1020.

In operation 1010, the electronic device may detect an additional non-PSC by scanning the third channels or the fourth channels.

In operation 1020, the electronic device may scan the additional non-PSC by using at least one of a first core and a second core. Scanning the additional non-PSC may be referred to as a third scan.

Figure 11:
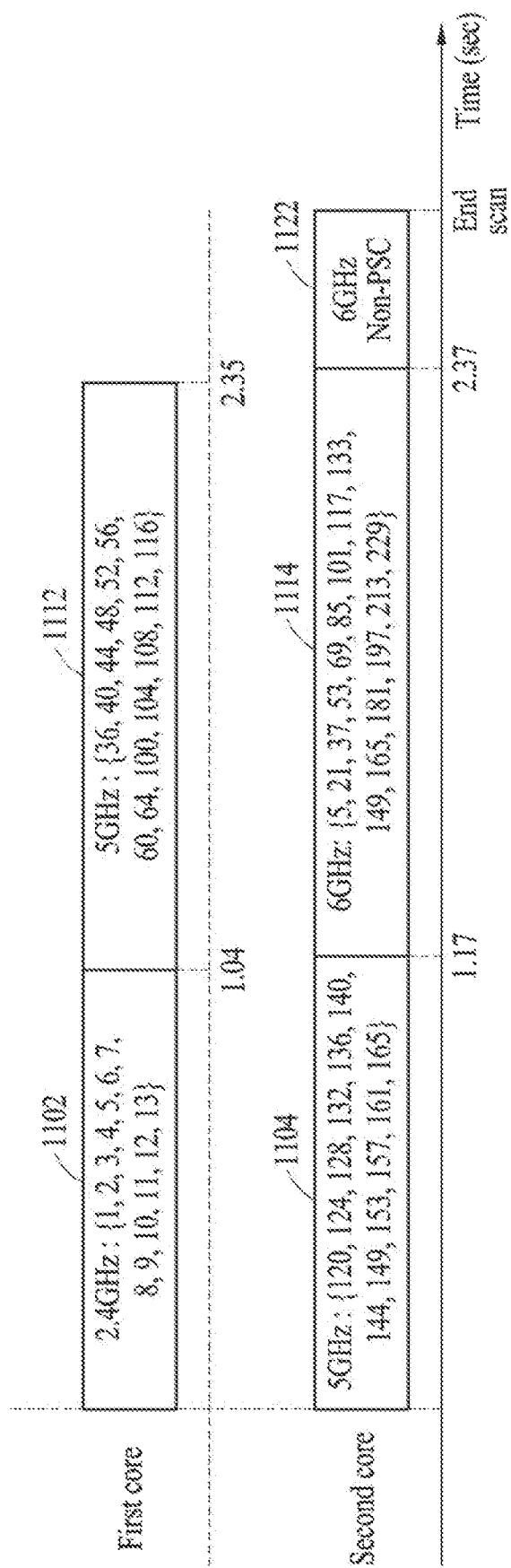
FIG. 11 is a diagram illustrating a method of performing additional scanning when setting an expected number of non-PSCs to 0, according to an example embodiment.

FIG. 11 is a diagram illustrating a method of performing additional scanning when an expected number of non-PSCs is 0, according to an example embodiment.

FIG. 11 illustrates first channels 1102, second channels 1104, third channels 1112, and fourth channels 1114 determined when a preset expected number of non-PSCs is 0. For example, the first channels 1102 may include channels 1, 2, 3, 4, 5, 6, 7, 8, 9, 10, 11, 12, and 13 in a 2.4 GHz band and the second channels 1104 may include channels 120, 124, 128, 132, 136, 140, 144, 149, 153, 157, 161, and 165 in a 5 GHz band. The third channels 1112 may include channels 36, 40, 44, 48, 52, 56, 60, 64, 100, 104, 108, 112, and 116 in the 5 GHz band, and the fourth channels 1114 may include channels 5, 21, 37, 53, 69, 85, 101, 117, 133, 149, 165, 181, 197, 213, and 229, which are PSCs, in a 6 GHz band.

In an example embodiment, when the third channels 1112 or the fourth channels 1114 have been scanned and channels 1122, which are non-PSCs, in the 6 GHz band are detected through a first scan and/or a second scan, a third scan, which is additional scanning, may be performed. In this case, an end time of the second scan by a first core (e.g., the first core 404 of FIG. 4) may be 2.35 sec, an end time of the second scan by a second core (e.g., the second core 406 of FIG. 4) may be 2.37 sec, and an end time of the third scan by the second core may be determined based on the number of channels 1122, which are detected non-PSCs, in the 6 GHz band.

Figure 12:
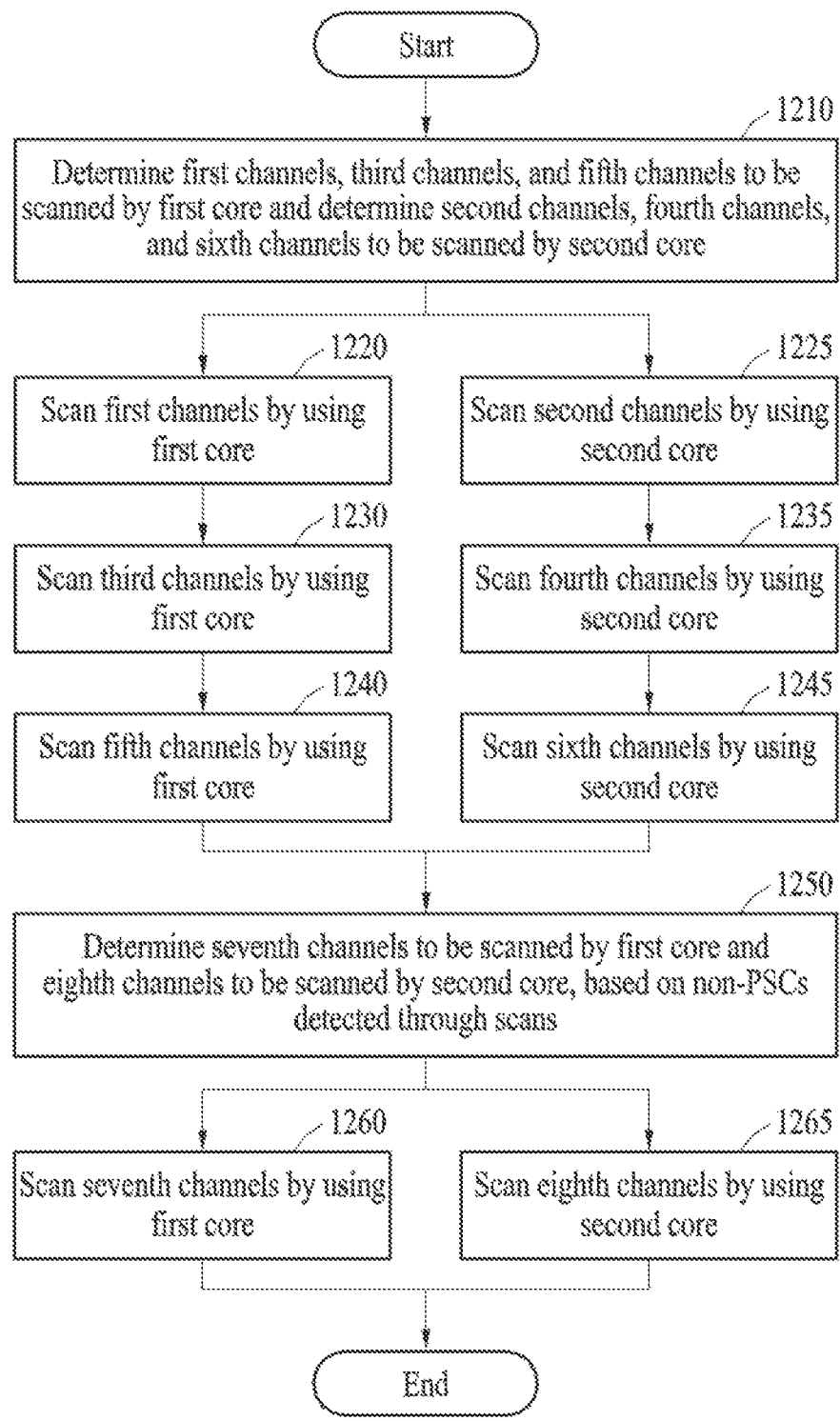
FIG. 12 is a flowchart illustrating a method of scanning a plurality of channels, according to an example embodiment.

FIG. 12 is a flowchart illustrating a method of scanning a plurality of channels, according to an example embodiment.

An electronic device (e.g., the electronic device 101 of FIG. 1 or the electronic device 200 of FIG. 2) may perform operations 1210 to 1265.

In an example embodiment, an AP (e.g., the main processor 121 of FIG. 1) of the electronic device may perform operations 1210 to 1265.

In another example embodiment, a CP (e.g., the CP 402 of FIG. 4) of a communication module (e.g., the communication module 190 of FIG. 1 or the communication module 400 of FIG. 4) of the electronic device may perform operations 1210 to 1265.

Before performing operation 1210, the electronic device may determine an available frequency band and determine all channels to be scanned in the determined frequency band. For example, an available frequency band and channels in the available frequency band may vary depending on the country.

In operation 1210, the electronic device may determine first channels, third channels, and fifth channels in frequency bands to be scanned by a first core (e.g., the first core 404 of FIG. 4) and determine second channels, fourth channels, and sixth channels in frequency bands to be scanned by a second core (e.g., the second core 406 of FIG. 4). For example, each of the first channels and the second channels may include 0 or one or more channels among channels in a 2.4 GHz band. For example, each of the third channels and the fourth channels may include 0 or one or more channels among channels in a 5 GHz band. In addition, each of the fifth channels and the sixth channels may include 0 or one or more channels among channels in a 6 GHz band. The numbers of first to sixth channels may be determined such that a total scanning time may be minimized.

In an example embodiment, when a frequency band (or a channel) scannable by each of the first and second cores of the electronic device is not limited, Equation 3 described above may be expanded to Equation 5 below. For example, each of the first and second cores of the electronic device may scan the 2.4 GHZ, 5 GHZ, and 6 GHz bands.

In Equation 5, k and 1 may respectively be the number of channels in the 2.4 GHz band and the number of PSCs in the 6 GHz band, in which the 2.4 GHz and the 6 GHz bands may be scanned by the second core.

$$i, j, k, l = \min_{i,j,k,l}\{\max\{((N_{2g} - k) \times A_{2g} + (N_{5g,nonDFS} - i) \times A_{5g} + \text{[Equation 5]}$$
$$(N_{5g,DFS} - j) \times P_{5g} + (N_{6g,PSC} - l) \times S_{6g}),$$
$$(k \times A_{2g} + i \times A_{5g} + j \times P_{5g} + l \times S_{6g})\}\}$$

i, j, k, and l each may be determined such that a scanning time may be minimized, and based on the determined i, j, k, and l, the first, second, third, fourth, fifth, and sixth channels each may be determined.

In operation 1220, the electronic device may scan the first channels by using the first core. For example, the first channels may be scanned for a first time.

In operation 1225, the electronic device may scan the second channels by using the second core. For example, the second channels may be scanned for a second time. The first time and the second time may have the same start time and at least partially overlap each other. The scanning of the first channels and the second channels may be referred to as a first scan.

In operation 1230, the electronic device may scan the third channels by using the first core. For example, the third channels may be scanned for a third time.

In operation 1235, the electronic device may scan the fourth channels by using the second core. For example, the fourth channels may be scanned for a fourth time. The third time and the fourth time may partially overlap each other. The scanning of the third channels and the fourth channels may be referred to as a second scan.

In operation 1240, the electronic device may scan the fifth channels by using the first core. For example, the fifth channels may be scanned for a fifth time.

In operation 1245, the electronic device may scan the sixth channels by using the second core. For example, the sixth channels may be scanned for a sixth time. The fifth time and the sixth time may at least partially overlap each other. The scanning of the fifth channels and the sixth channels may be referred to as a third scan.

In an example embodiment, when the channels, which are non-PSCs, in the 6 GHz band are detected through the first scan, the second scan, and the third scan, a fourth scan, which is additional scanning, may be performed.

In operation 1250, the electronic device may determine seventh channels to be scanned by the first core and eighth channels to be scanned by the second core, based on the detected non-PSCs through the first, second, and third scans.

The seventh channels and the eighth channels may be determined such that a time of performing the fourth scan may be minimized.

In operation 1260, the electronic device may scan the seventh channels by using the first core. For example, the seventh channels may be scanned for a seventh time.

In operation 1265, the electronic device may scan the eighth channels by using the second core. For example, the eighth channels may be scanned for an eighth time. The seventh time and the eighth time may at least partially overlap each other.

Figure 13:
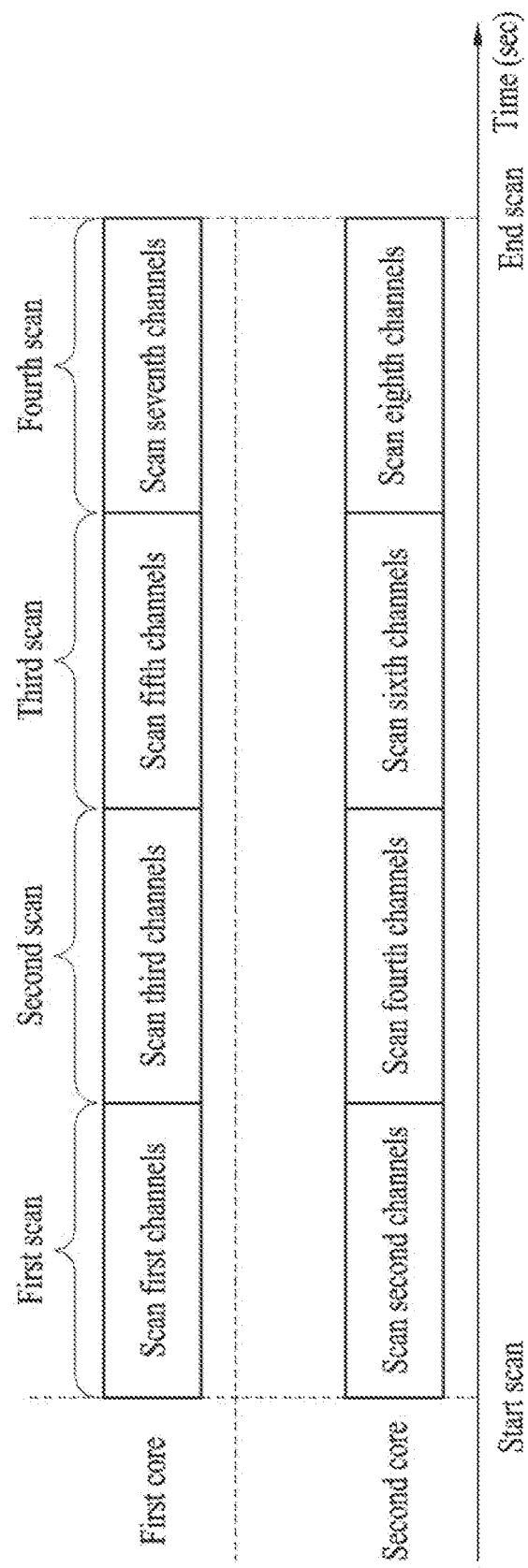
FIG. 13 is a diagram illustrating a method of scanning a plurality of channels through a plurality of cores, according to an example embodiment.

FIG. 13 is a diagram illustrating a method of scanning a plurality of channels through a plurality of cores, according to an example embodiment.

In an example embodiment, an electronic device (e.g., the electronic device 101 of FIG. 1 or the electronic device 200 of FIG. 2) may determine first channels, second channels, third channels, fourth channels, fifth channels, and sixth channels such that an end time of a third scan by each of the plurality of cores may be minimized.

For example, based on an expected number of non-PSCs, the electronic device may determine the first, second, third, and fourth channels before performing a first scan. For example, the expected number may be n including 0. When the expected number is 0, the electronic device may determine the first, second, third, and fourth channels excluding non-PSCs.

In an example embodiment, each of the first channels and the second channels may include 0 or one or more channels among channels in a 2.4 GHz band, each of the third channels and the fourth channels may include 0 or one or more channels among channels in a 5 GHz band, and each of the fifth channels and sixth channels may include 0 or one or more channels among channels in a 6 GHz band. In this case, the terms "2.4 GHz band", "5 GHz band", and "6 GHz band" may interchangeably be used with one another. For example, each of the first channels and the second channels may include 0 or one or more channels among the channels in the 5 GHz band.

In an example embodiment, when a non-PSC is detected through the first scan, a second scan, and a third scan, a fourth scan, which is additional scanning, may be performed. For example, based on the detected non-PSC, seventh channels with respect to the first core and eighth channels with respect to the second core may be determined, and the seventh channels and the eighth channels may be scanned through the fourth scan.

Figure 14:
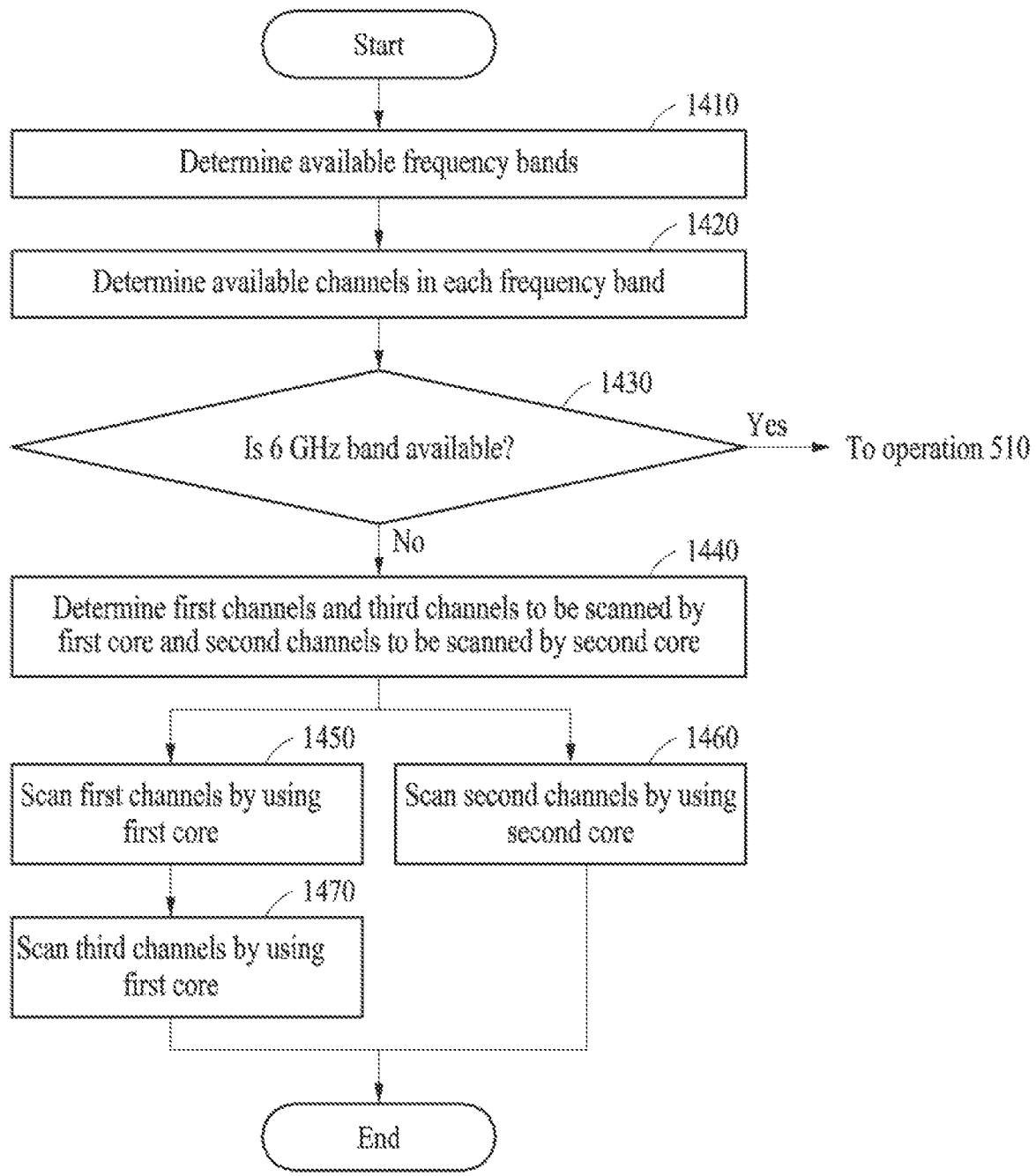
FIG. 14 is a flowchart illustrating a method of scanning a plurality of channels, according to an example embodiment.

FIG. 14 is a flowchart illustrating a method of scanning a plurality of channels, according to an example embodiment.

An electronic device (e.g., the electronic device 101 of FIG. 1 or the electronic device 200 of FIG. 2) may perform operations 1410 to 1470.

In an example embodiment, an AP (e.g., the main processor 121 of FIG. 1) of the electronic device may perform operations 1410 to 1470.

In an example embodiment, a CP (e.g., the CP 402 of FIG. 4) of a communication module (e.g., the communication module 190 of FIG. 1 or the communication module 400 of FIG. 4) of the electronic device may perform operations 1410 to 1470.

In operation 1410, the electronic device may determine one or more target frequency bands available for a scan in a country (or a region) where the electronic device is. For example, the electronic device may determine a frequency band available in the country, based on a country code set for the electronic device. For example, the country code may be obtained based on a communication network, such as a cellular network, a fifth generation (5G) network, a next-generation communication network, the Internet, or a computer network (e.g., a LAN or a WAN).

In an example embodiment, the frequency band available in the country may include 2.4 GHZ, 5 GHZ, and 6 GHz bands.

In another example embodiment, the frequency band available in the country may include the 2.4 GHz and 5 GHz bands and may not include the 6 GHz band.

In operation 1420, the electronic device may determine available channels (or the number of channels) in the target frequency bands determined to be available.

In operation 1430, the electronic device may determine whether a preset frequency band (e.g., the 6 GHz band) is available, based on the target frequency bands of the electronic device. For example, whether the 6 GHz band is included in the target frequency bands may be determined.

When the 6 GHz band is available, operation 510 described above with reference to FIG. 5 may be performed. When the 6 GHz band is not available, operation 1440 may be performed.

In operation 1440, the electronic device may determine first channels and third channels in frequency bands to be scanned by a first core (e.g., the first core 404 of FIG. 4) and second channels in frequency bands to be scanned by a second core (e.g., the second core 406 of FIG. 4). For example, the first channels may include at least some of channels in the 2.4 GHz band, second channels may include at least some of channels in the 5 GHz band, and the third channels may include the rest of the channels in the 5 GHz band which are not included in the second channels, but channels included by the first, second, and third channels may not be limited to the foregoing examples.

In an example embodiment, the electronic device may determine the first, second, and third channels by using Equation 3 described above. For example, in Equation 3, when $N_{6g}, PSC=0$, i=8 and j=10 may be determined. In this case, i may be the number of non-DFS channels included in the second channels among the channels in the 5 GHz band and j may be the number of DFS channels included in the second channels among the channels in the 5 GHz band.

In an example embodiment, the electronic device may determine the first, second, and third channels by using the determined i and j values. For example, the channels in the 5 GHz band may be classified into the second channels and the third channels such that interference between a scan by the first core and a scan by the second core may decrease.

In operation 1450, the electronic device may scan the first channels by using the first core. For example, the first channels may be scanned for a first time.

In an example embodiment, when the first channels are 13 channels in the 2.4 GHz band, active scanning may be performed on 13 channels. For example, the active scanning time may be preset to 80 ms but may not be limited thereto. When a scanning time for each channel is 80 ms, the time needed for the first scan by the first core may be 13×80 ms=1.04 sec.

In operation 1460, the electronic device may scan the second channels by using the second core. For example, the second channels may be scanned for a second time. The first time and the second time may have the same start time and at least partially overlap each other.

In an example embodiment, the second channels may be some (e.g., 18 channels) of the channels in the 5 GHz band. For example, the second channels may include channels 40, 44, 48, 108, 112, 116, 120, 124, 128, 132, 136, 140, 144, 149, 153, 157, 161, and 165. When the channels are DFS channels, passive scanning may be performed, and when the channels are not DFS channels, active scanning may be performed. In the 5 GHz band, the active scanning may be performed on channels 40, 44, 48, 149, 153, 157, 161, and 165 and the passive scanning may be performed on channels 108, 112, 116, 120, 124, 128, 132, 136, 140, and 144, which are DFS channels.

For example, the passive scanning time may be preset to 110 ms but may not be limited thereto.

For example, the active scanning time may be preset to 80 ms and the passive scanning time may be preset to 110 ms, but a scanning time may not be limited to the foregoing examples.

In this case, the time needed for the scan by the second core may be (8×80 ms)
+ (10×110 ms)=1.74 sec.

In an example embodiment, an end time of the scan by the first core may be different from an end time of the scan by the second core.

In operation 1470, the electronic device may scan the third channels by using the first core. For example, the third channels may be scanned for a third time after the first time. The third time may at least partially overlap with the second time.

In an example embodiment, the third channels may be some (e.g., 7 channels) of the channels in the 5 GHz band. For example, the third channels may include channels 36, 52, 56, 60, 64, 100, and 104. When the channels are DFS channels, passive scanning may be performed, and when the channels are not DFS channels, active scanning may be performed. In the 5 GHz band, the active scanning may be performed on channel 36 and the passive scanning may be performed on channels 52, 56, 60, 64, 100, and 104, which are DFS channels.

In this case, the time needed for a second scan by the second core may be (1×80 ms)+ (6×110 ms)=0.74 sec.

According to the foregoing examples, a total time of performing, by the first core, the first scan of the first channels and the second scan of the third channels may be 1.78 sec and a total time of performing, by the second core, the scan of the second channels may be 1.74 sec, and thus, a final end time of scanning may be 1.78 sec.

In an example embodiment, the electronic device may detect a hub device or another electronic device by scanning the first, second, and third channels and may perform wireless communication with the hub device or the other electronic device.

Figure 15:
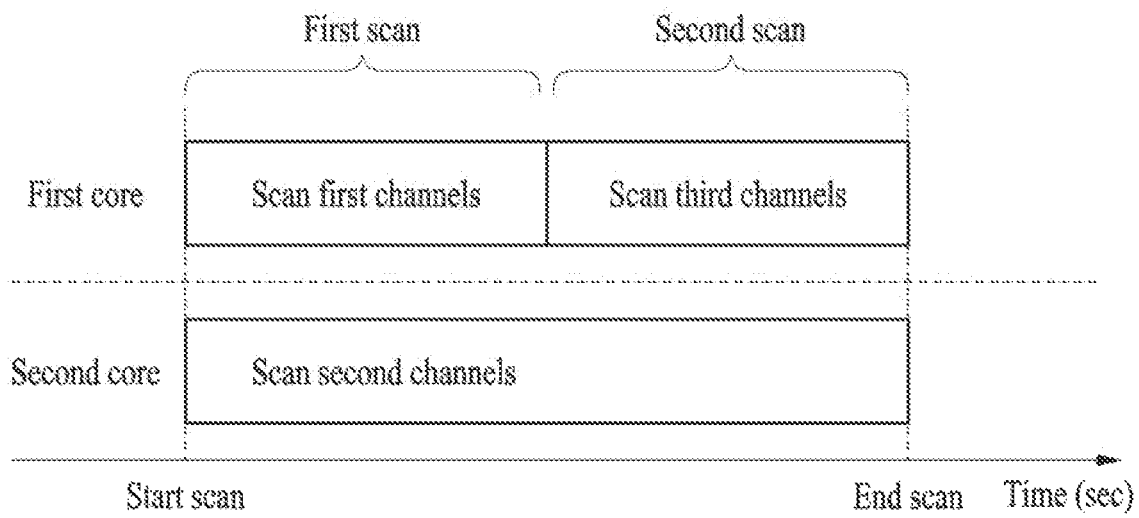
FIG. 15 is a diagram illustrating a method of scanning a plurality of channels not including channels in a 6 GHz band, according to an example embodiment.

FIG. 15 is a diagram illustrating a method of scanning a plurality of channels not including channels in a 6 GHz band, according to an example embodiment.

In an example embodiment, an electronic device (e.g., the electronic device 101 of FIG. 1 or the electronic device 200 of FIG. 2) may predetermine first channels, second channels, third channels, and fourth channels such that an end time of scanning by each core may be minimized.

For example, when the 6 GHz band is not available in a country, the first, second, and third channels may be determined based on channels in a 2.4 GHz band and a 5 GHz band such that a total time of performing a scan may be minimized.

Figure 16:
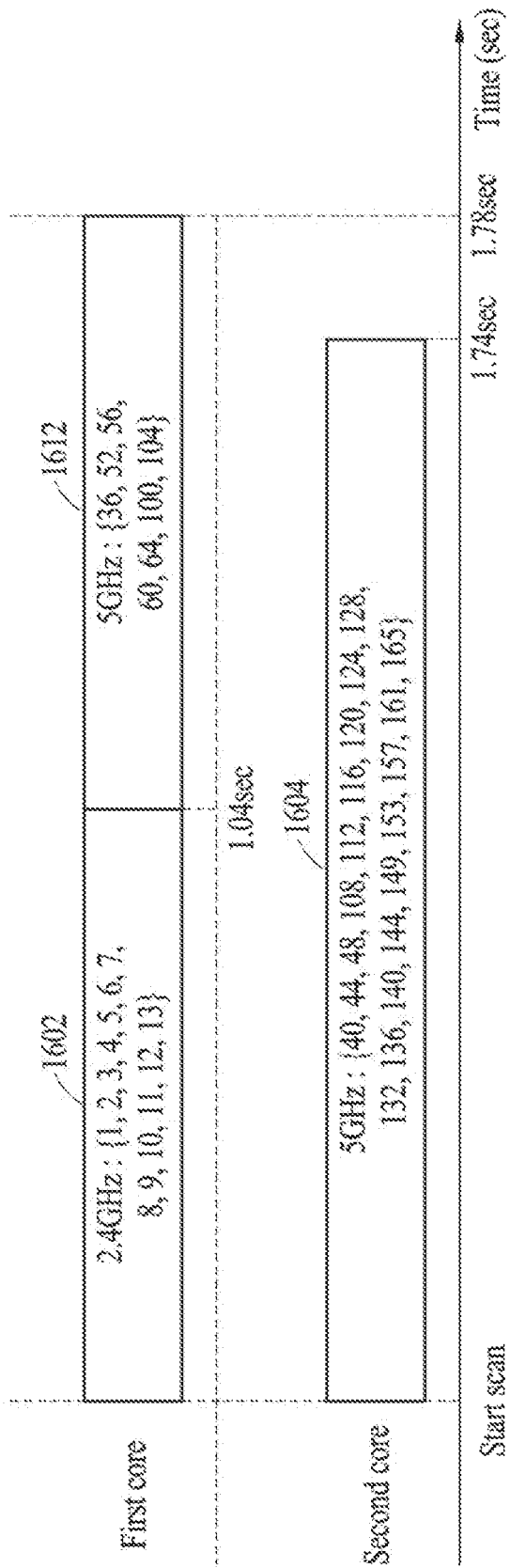
FIG. 16 is a diagram illustrating first channels, second channels, and third channels not including channels in a 6 GHz band, according to an example embodiment.

FIG. 16 is a diagram illustrating first channels, second channels, and third channels not including channels in a 6 GHz band, according to an example embodiment.

FIG. 16 illustrates first channels 1602, second channels 1604, and third channels 1612 determined when the channels in the 6 GHz band are not available.

For example, the first channels 1602 may include channels 1, 2, 3, 4, 5, 6, 7, 8, 9, 10, 11, 12, and 13 in a 2.4 GHz band, the second channels 1604 may include channels 40, 44, 48, 108, 112, 116, 120, 124, 128, 132, 136, 140, 144, 149, 153, 157, 161, and 165 in a 5 GHz band, and the third channels 1612 may include channels 36, 52, 56, 60, 64, 100, and 104 in the 5 GHz band. For example, a total time needed for scanning the first, second, and third channels 1602, 1604, and 1612 may be 1.78 sec. However, the total time needed for scanning may vary depending on whether the scanning is active scanning or passive scanning.

According to an example embodiment, an electronic device (e.g., the electronic device 101 or the electronic device 200 of FIG. 2) may include a communication module (e.g., the communication module 190 of FIG. 1 or the communication module 400 of FIG. 4) configured to exchange data with an external device, in which the communication module includes a first core (e.g., the first core 404 of FIG. 4) and a second core (e.g., the second core 406 of FIG. 4) and at least one processor (e.g., the processor 120 of FIG. 1 or the CP 402 of FIG. 4) configured to control the electronic device, in which the at least one processor is configured to determine first channels to be scanned by the first core and second channels to be scanned by the second core, scan the first channels by using the first core for a first time, scan the second channels by using the second core for a second time, determine third channels to be scanned by the first core and fourth channels to be scanned by the second core, based on a PSC detected based on at least one of the first channels and the second channels, scan the third channels by using the first core for a third time after the first time, and scan the fourth channels by using the second core for a fourth time after the second time.

The processor may include a CP in the communication module or an AP of the electronic device.

The first channels may include one or more channels in a 2.4 GHz band, and the second channels may include one or more channels in a 5 GHz band.

The third channels may include one or more channels, different from the second channels, in the 5 GHz band, and the fourth channels may include one or more PSCs in a 6 GHz band.

The fourth channels may include non-PSCs in the 6 GHz band.

The first time and the second time may at least partially overlap each other, and the third time and the fourth time may at least partially overlap each other.

The at least one processor may determine the first channels and the second channels, based on a preset expected number of non-PSCs.

The at least one processor may determine the third channels and the fourth channels such that a difference between an end of the third time and an end of the fourth time may be minimized.

The at least one processor may determine preliminary third channels to be scanned by the first core and preliminary fourth channels to be scanned by the second core and may determine the third channels and the fourth channels by adjusting the preliminary third channels and the preliminary fourth channels, based on the number of detected non-PSCs.

The at least one processor may detect an additional non-PSC by scanning the third channels or the fourth channels and scan the additional non-PSC by using at least one of the first core and the second core.

The electronic device may include a mobile communication terminal.

According to an example embodiment, a method performed by an electronic device (e.g., the electronic device 101 of FIG. 1 or the electronic device 200 of FIG. 2) includes an operation (e.g., operation 510 of FIG. 5) of determining first channels to be scanned by a first core and second channels to be scanned by a second core, an operation (e.g., operation 520 of FIG. 5) scanning the first channels by using the first core for a first time, an operation (e.g., operation 530 of FIG. 5) of scanning the second channels by using the second core for a second time, an operation (e.g., operation 540 of FIG. 5) of determining third channels to be scanned by the first core and fourth channels to be scanned by the second core, based on a non-PSC detected based on at least one of the first channels and the second channels, an operation (e.g., operation 550 of FIG. 5) of scanning the third channels by using the first core for a third time after the first time, and an operation (e.g., operation 560 of FIG. 5) of scanning the fourth channels by using the second core for a fourth time after the second time.

The first channels may include one or more channels in a 2.4 GHz band, and the second channels may include one or more channels in a 5 GHz band.

The third channels may include one or more channels, different from the second channels, in the 5 GHz band, and the fourth channels may include one or more PSCs in a 6 GHz band.

The fourth channels may include non-PSCs in the 6 GHz band.

The first time and the second time may at least partially overlap each other, and the third time and the fourth time may at least partially overlap each other.

The operation of determining the first channels to be scanned by the first core and the second channels to be scanned by the second core may include determining the first channels and the second channels, based on a preset expected number of non-PSCs.

The operation of determining the third channels to be scanned by the first core and the fourth channels to be scanned by the second core may include determining the third channels and the fourth channels such that a difference between an end of the third time and an end of the fourth time may be minimized.

The operation of determining the first channels to be scanned by the first core and the second channels to be scanned by the second core may include determining preliminary third channels to be scanned by the first core and preliminary fourth channels to be scanned by the second core, and the operation of determining the third channels to be scanned by the first core and the fourth channels to be scanned by the second core may include determining the third channels and the fourth channels by adjusting the preliminary third channels and the preliminary fourth channels, based on the number of detected non-PSCs.

The method may further include detecting an additional non-PSC by scanning the third channels or the fourth channels and scanning the additional non-PSC by using at least one of the first core and the second core.

According to an example embodiment, an electronic device (e.g., the electronic device 101 of FIG. 1 or the electronic device 200 of FIG. 2) includes a communication module (e.g., the communication module 190 of FIG. 1 or the communication module 400 of FIG. 4) configured to exchange data with an external device, in which the communication module includes a first core (the first core 404 of FIG. 4) and a second core (the second core 406 of FIG. 4) and at least one processor (e.g., the processor 120 of FIG. 1 or the CP 402 of FIG. 4) configured to control the electronic device, in which the at least one processor is configured to determine one or more target frequency bands available in a country where the electronic device is, determine channels available in the one or more target frequency bands, when a preset frequency band is not available based on the target frequency bands, determine first channels and third channels to be scanned by the first core and second channels to be scanned by the second core, scan the first channels by using the first core for a first time, scan the second channels by using the second core for a second time, and scan the third channels by using the first core for a third time.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described example examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other example embodiments, and equivalents to the claims are also within the scope of the following claims.

What is claimed is:

1. An electronic device comprising:
   a communication module configured to perform data communications with an external device, wherein the communication module comprises a first core and a second core;
   a memory storing instructions; and
   at least one processor configured to execute the instructions to:
   determine first channels to be scanned by the first core and second channels to be scanned by the second core,
   scan the first channels by using the first core for a first time,
   scan the second channels by using the second core for a second time,
   determine third channels to be scanned by the first core and fourth channels to be scanned by the second core, based on a non-preferred scanning channel (PSC) detected based on at least one of the first channels and the second channels,
   scan the third channels by using the first core for a third time after the first time, and
   scan the fourth channels by using the second core for a fourth time after the second time.

2. The electronic device of claim 1, wherein the at least one processor comprises a communication processor included in the communication module or an application processor.

3. The electronic device of claim 1, wherein the first channels comprise at least one channel in a 2.4 GHz band, and
   the second channels comprise at least one channel in a 5 GHz band.

4. The electronic device of claim 3, wherein the third channels comprise at least one channel in the 5 GHz band, the third channels being different from the second channels, and
   the fourth channels comprise at least one PSC in a 6 GHz band.

5. The electronic device of claim 4, wherein the fourth channels comprise at least one non-PSC in the 6 GHz band.

6. The electronic device of claim 1, wherein the first time and the second time at least partially overlap each other, and
   the third time and the fourth time at least partially overlap each other.

7. The electronic device of claim 1, wherein the at least one processor is further configured to execute the instructions to determine the first channels and the second channels, based on a preset expected number of non-PSCs.

8. The electronic device of claim 1, wherein the at least one processor is further configured to execute the instructions to determine the third channels and the fourth channels such that a difference between an end of the third time and an end of the fourth time is minimized.

9. The electronic device of claim 1, wherein the at least one processor is further configured to execute the instructions to:
   determine preliminary third channels to be scanned by the first core and preliminary fourth channels to be scanned by the second core, and
   determine the third channels and the fourth channels by adjusting the preliminary third channels and the preliminary fourth channels, based on the number of detected non-PSCs.

10. The electronic device of claim 1, wherein the at least one processor is further configured to execute the instructions to:
    detect an additional non-PSC by scanning the third channels or the fourth channels, and
    scan the additional non-PSC by using at least one of the first core and the second core.

11. The electronic device of claim 1, wherein the electronic device further comprises a mobile communication terminal.

12. A method for scanning channels in frequency bands performed by an electronic device, the method comprising:
- determining first channels to be scanned by a first core of a communication module of the electronic device and second channels to be scanned by a second core of the communication module of the electronic device;
- scanning the first channels by using the first core for a first time;
- scanning the second channels by using the second core for a second time;
- determining third channels to be scanned by the first core and fourth channels to be scanned by the second core, based on a non-preferred scanning channel (PSC) detected based on at least one of the first channels and the second channels;
- scanning the third channels by using the first core for a third time after the first time; and
- scanning the fourth channels by using the second core for a fourth time after the second time.

13. The method of claim 12, wherein the first channels comprise at least one channel in a 2.4 GHz band, and
- the second channels comprise at least one channel in a 5 GHz band.

14. The method of claim 13, wherein the third channels comprise at least one channel in the 5 GHz band, the third channels being different from the second channels, and
- the fourth channels comprise at least one PSC in a 6 GHz band.

15. The method of claim 14, wherein the fourth channels comprise at least one non-PSCs in the 6 GHz band.

16. The method of claim 12, wherein the first time and the second time at least partially overlap each other, and
- the third time and the fourth time at least partially overlap each other.

17. The method of claim 12, wherein the determining the first channels to be scanned by the first core and the second channels to be scanned by the second core comprises determining the first channels and the second channels, based on a preset expected number of non-PSCs.

18. The method of claim 12, wherein the determining the third channels to be scanned by the first core and the fourth channels to be scanned by the second core comprises determining the third channels and the fourth channels such that a difference between an end of the third time and an end of the fourth time is minimized.

19. The method of claim 12, further comprising:
- detecting an additional non-PSC by scanning the third channels or the fourth channels; and
- scanning the additional non-PSC by using at least one of the first core and the second core.

20. An electronic device comprising:
- a communication module configured to perform data communications with an external device, wherein the communication module comprises a first core and a second core;
- a memory storing instructions; and
- at least one processor configured to execute the instructions to:
  - determine at least one target frequency band available to the electronic device, based on a geographic region of the electronic device,
  - determine channels available in the at least one target frequency band;
  - based on a preset frequency band not being available based on the target frequency band, determine first channels and third channels to be scanned by the first core and second channels to be scanned by the second core;
  - scan the first channels by using the first core for a first time,
  - scan the second channels by using the second core for a second time, and
  - scan the third channels by using the first core for a third time.

* * * * *